(12) United States Patent
Trim et al.

(10) Patent No.: US 11,990,784 B2
(45) Date of Patent: May 21, 2024

(54) INFORMATION HANDLING SYSTEM MANAGING A POWER LEVEL WITHIN A BATTERY

(71) Applicant: DELL PRODUCTS, LP, Round Rock, TX (US)

(72) Inventors: James D. Trim, Pflugerville, TX (US); Abu S. Sanaullah, Austin, TX (US); Daniel L. Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 613 days.

(21) Appl. No.: 17/185,213

(22) Filed: Feb. 25, 2021

(65) Prior Publication Data

US 2022/0271555 A1    Aug. 25, 2022

(51) Int. Cl.
*H02J 7/00* (2006.01)

(52) U.S. Cl.
CPC ...... *H02J 7/00714* (2020.01); *H02J 7/00302* (2020.01); *H02J 7/0048* (2020.01); *H02J 7/0063* (2013.01)

(58) Field of Classification Search
CPC .................................................. H02J 7/00714
USPC ......................................................... 320/134
See application file for complete search history.

(56) References Cited

U.S. PATENT DOCUMENTS

| | | | |
|---|---|---|---|
| 8,479,024 B2 | 7/2013 | Vichare et al. | |
| 8,581,554 B2 * | 11/2013 | Saligram | H02J 7/04 320/132 |
| 2012/0054333 A1 * | 3/2012 | Vichare | G06F 9/5011 709/224 |
| 2015/0084601 A1 * | 3/2015 | Hing | B60L 53/305 320/132 |
| 2019/0196575 A1 | 6/2019 | Grobelny et al. | |

\* cited by examiner

*Primary Examiner* — Yalkew Fantu
(74) *Attorney, Agent, or Firm* — Larson Newman, LLP

(57) ABSTRACT

An information handling system includes a battery, an embedded controller, and a processor. The embedded controller collects a battery charge status for the battery, and provides the battery charge status to the processor. The processor also receives data indicating a current battery discharge rate. The processor determines a second battery discharge rate based on operations to be performed during a period of time. The processor also determines a needed battery charge level at a start of the period of time. Based on the battery charge status, the current battery discharge rate, the second battery discharge rate, and the needed battery charge level, the processor sets the information handling system in a state to achieve the battery charge level.

20 Claims, 5 Drawing Sheets

INFORMATION HANDLING SYSTEM MANAGING A POWER LEVEL WITHIN A BATTERY

FIELD OF THE DISCLOSURE

The present disclosure generally relates to information handling systems, and more particularly relates to battery power management.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a battery, an embedded controller, and a processor. The embedded controller may collect a battery charge status for the battery, and provide the battery charge status to the processor. The processor may also data indicating a current battery discharge rate. The processor may determine a second battery discharge rate based on operations to be performed during a period of time. The processor also may determine a needed battery charge level at a start of the period of time. Based on the battery charge status, the current battery discharge rate, the second battery discharge rate, and the needed battery charge level, the processor may set the information handling system in a state to achieve the battery charge level.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
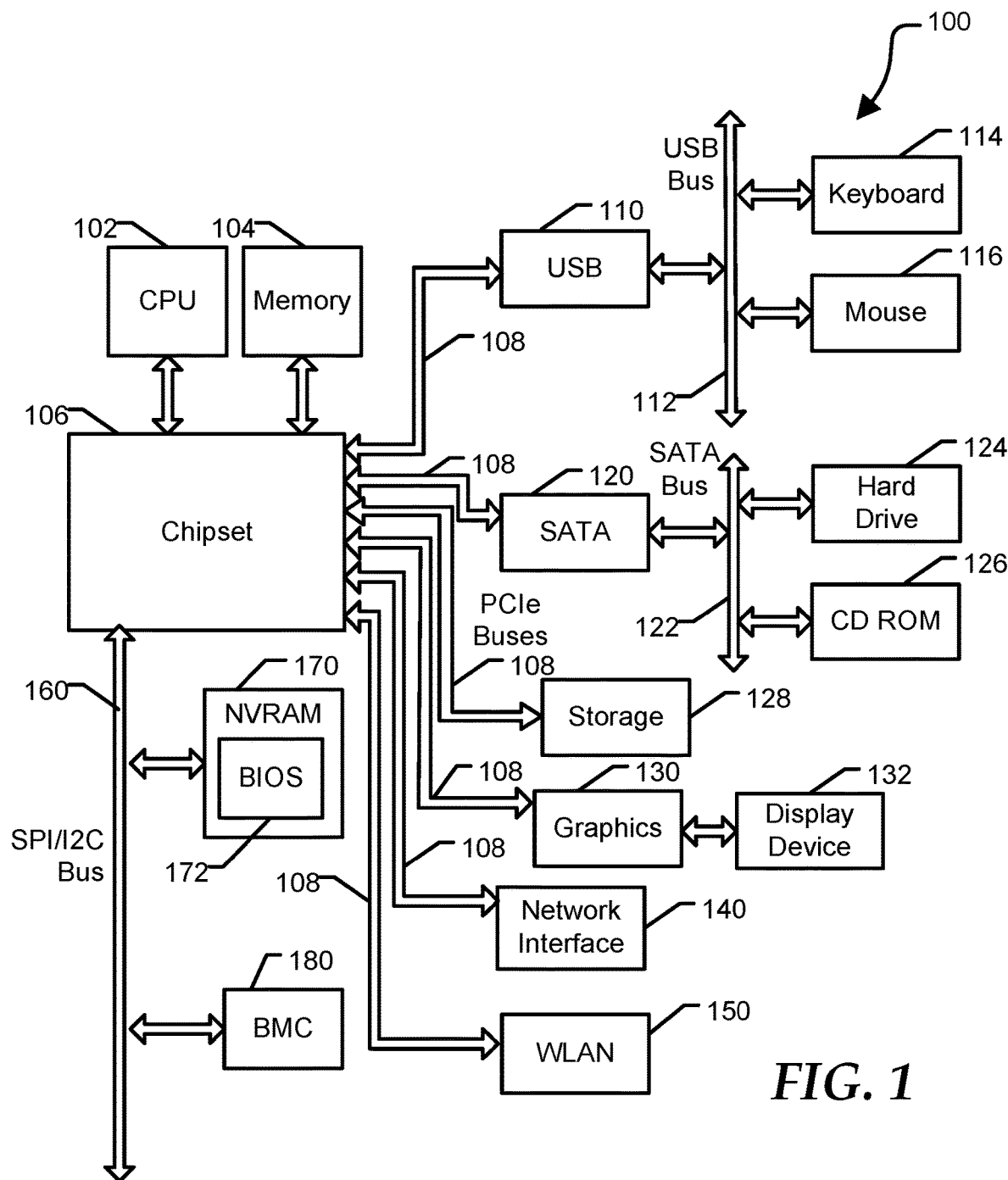
FIG. 1 is a block diagram of a general information handling system according to at least one embodiment of the present disclosure.

FIG. 1 illustrates a general information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 100 including a processor 102, a memory 104, a chipset 106, one or more PCIe buses 108, a universal serial bus (USB) controller 110, a USB bus 112, a keyboard device controller 114, a mouse device controller 116, a configuration a SATA bus controller 120, a SATA bus 122, a hard drive device controller 124, a compact disk read only memory (CD ROM) device controller 126, a storage 128, a graphics device controller 130, a network interface controller (NIC) 140, a wireless local area network (WLAN) or wireless wide area network (WWAN) controller 150, a serial peripheral interface (SPI) bus 160, a NVRAM 170 for storing BIOS 172, and a baseboard management controller (BMC) 180. In an example, chipset 106 may be directly connected to an individual end point via a PCIe root port within the chipset and a point-to-point topology as shown in FIG. 1. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One or more components can be integrated together. For example, portions of chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Figure 2:
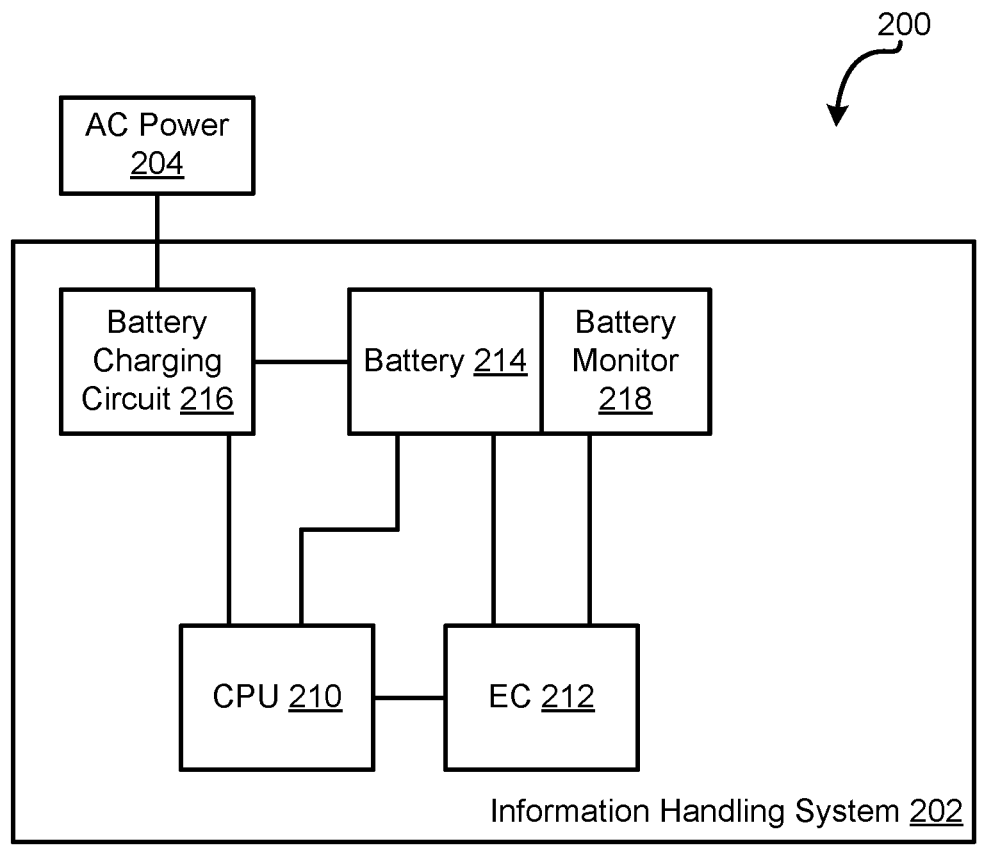
FIG. 2 is a diagram of a system including an information handling system and an alternating current power source according to at least one embodiment of the disclosure.

In an example, information handling system 100 may be any suitable device including, but not limited to, compute device 202 of FIG. 2. Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

FIG. 2 illustrates a system 200 including an information handling system 202 and an alternating current (AC) power source 204 according to at least one embodiment of the disclosure. Information handling system 202 includes a processor 210, and embedded controller (EC) 212, a battery 214, a battery charging circuit 216, and a battery monitoring device 218. In certain examples, information handling system 202 may include additional components over those shown in FIG. 2 without varying from the scope of this disclosure.

In an example, AC power source 204 may provide power to battery charging circuit 216, which in turn may charge battery 214. In certain examples, processor 210 may control a charging rate at which battery charging circuit 216 may charge battery 214. Processor 210 may set or change the charging rate for battery 214 based on any suitable data. For example, processor 210 may determine that a user of information handling system 202 may have an upcoming event in which AC power source 204 is not available. In an example, the event may be any suitable activity including, but not limited to, a transit activity. In certain examples, the transit activity may involve the user traveling from a current location to a meeting location, traveling to an airport, and traveling on a flight.

Processor 210 may perform one or more suitable operations to determine sufficient power capabilities needed for the event so that battery 214 does not lose all of its charge before the end of the event. In an example, processor 210 may determine a particular charge level for needed for battery 214 at the start of the event so that the battery may provide sufficient power to the components of information handling system 202 during the event. Processor 210, EC 212, and battery monitoring device 218 may perform one or more operations to improve information handling system 202 by ensuring battery 214 has sufficient power capabilities during an upcoming event.

Figure 3:
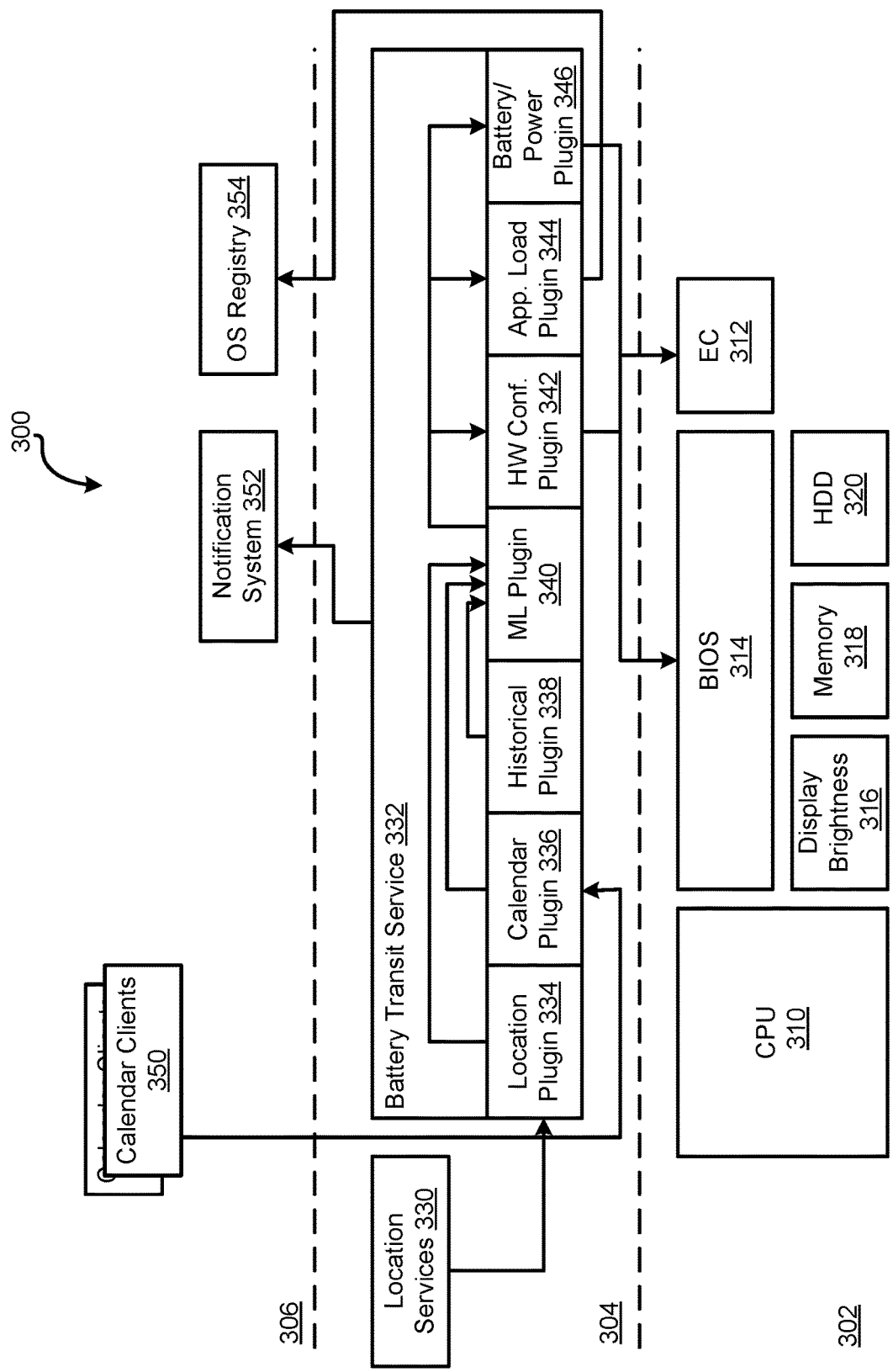
FIG. 3 is an architecture block diagram of the information handling system according to at least one embodiment of the disclosure.

FIG. 3 illustrates an information handling system 300 according to at least one embodiment of the disclosure. In an example, information handling system 300 may be substantially similar to information handling system 200 of FIG. 2. Operation of different components within information handling system 300 may be performed in one of the following: a hardware layer 302; a service layer 304; and an application layer 306. Components of hardware layer 302 include a processor 302, an EC 312, a BIOS 314, a display brightness control circuit 316, a memory 318, and a hard disk drive (HDD) 320. One of ordinary skill in the art would recognize that information handling system 300 may include additional components within hardware layer 302 without varying from the scope of this disclosure.

Services within service layer 304 include location services 330 and battery transit service 332. Battery transit service 332 may include one or more plugins including, but not limited to, a location plugin 334, a calendar plugin 336, a historical plugin 338, a machine learning plugin 340, a hardware configuration plugin 342 an application load plugin 344 and a battery power plugin 346. One of ordinary skill in the art would recognize that information handling system 300 may include additional services and/or plugins within service layer 304 without varying from the scope of this disclosure. Applications within application service layer 306 include calendar clients 350, notification systems 352, and OS registry and application system 354. One of ordinary skill in the art would recognize that information handling system 300 may include additional applications within application layer 306 without varying from the scope of this disclosure.

During operation, processor 310 may perform one or more suitable operations to manage battery capabilities for an upcoming event. For example, processor 310 may receive or collect information and data from battery transit service 332 to determine a change, if any, needed for the charge level of a battery before the upcoming event. The battery discussed with respect to FIG. 3 may be any suitable battery including, but not limited to, battery 214 of FIG. 2. In an example, battery transit service 332 may be an OS service executed by processor 310. Battery transit service 332 may receive data from location services 330 and calendar clients 350, and processor 310 may utilize this and other data to determine any system changes needed to manage battery charge levels for an upcoming event.

In an example, battery power plugin 346 may collect a battery charge status from a battery monitoring device, such as battery monitoring device 218 of FIG. 2. Battery power plugin 346 may provide the battery charge status to EC 312, which in turn may provide the battery charge status to processor 310. In certain examples, the battery charge status may be any suitable data associated with the current charge level of the battery including, but not limited to, a current percentage of battery charge remaining, such as twenty percent, fifty percent, sixty percent, seventy-five percent, or the like.

Processor 310, via battery transit service 332, may collect any suitable data to determine current battery discharge rates and to determine future battery discharge rates. For example, location plugin 334 of processor 310 may receive location data for information handling system 300 from location services 330. In an example, location services 330 may determine a current location of information handling system 300 by any suitable means, such as GPS location, information from a WiFi network, or the like.

Processor 310 may collect information associated with one or more upcoming events, such as a meeting, from calendar clients 350. In an example, calendar plugin 336 may periodically pull calendar events from calendar clients 350. In certain examples, the calendar plugin 336 may collect location information for the event, duration of the event, or the like. Based on the current location of information handling system 300 and the location of the upcoming event, processor 310 may calculate transit routes and transit times to get to the upcoming event.

Processor 310 may perform one or more suitable operations to determine battery discharge rates for the upcoming event and transit to the event. In an example, the future battery discharge rate may be determined based on any suitable information associated with expected usage in the information handling system. For example, the processor may determine expected workloads and battery consumption during a specific period of time. In certain examples, the processor may execute learned computer models, such as ML plugin 340, to determine expected workloads. In an example, ML plugin 340 may receive and utilize current location data from location plugin 334, information about an upcoming event from calendar plugin 336, and historical data from historical data plugin 338 to determine an expected discharge rate for the battery during the upcoming event including the transit. ML plugin 340 will be discussed with respect to FIG. 4.

Figure 4:
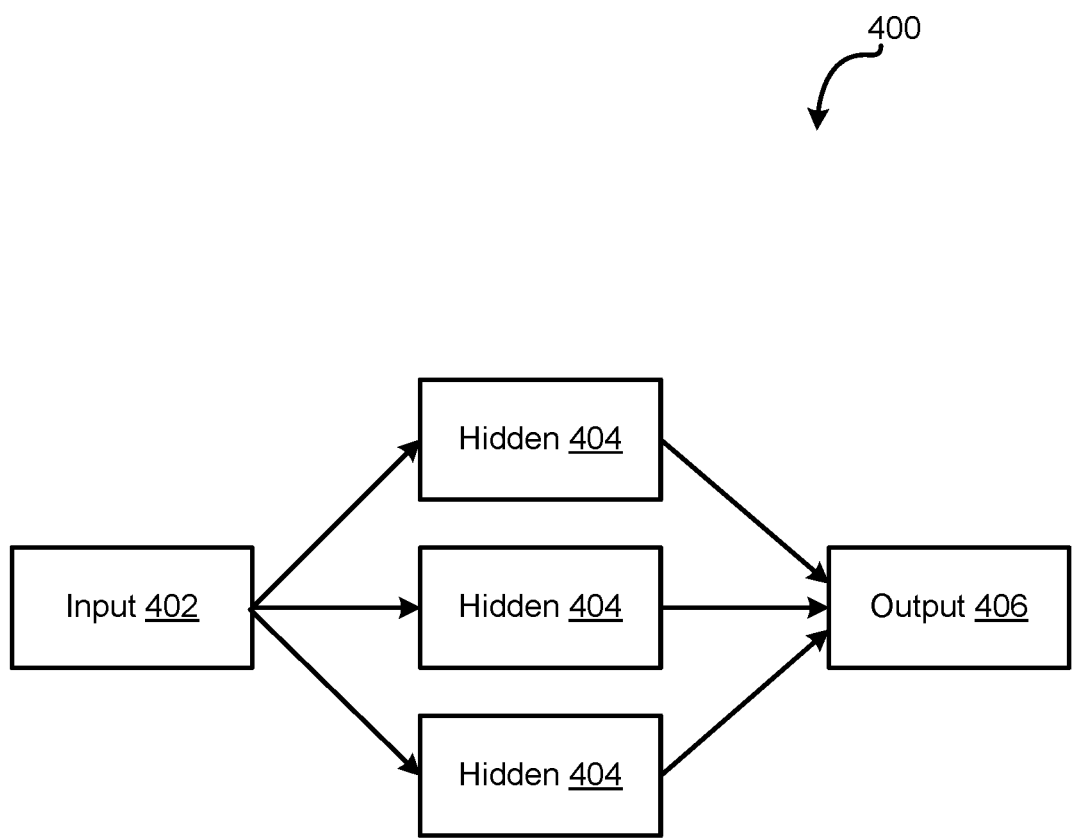
FIG. 4 is a block diagram of a battery discharge rate computer model according to at least one embodiment of the present disclosure.

FIG. 4 illustrates a battery discharge rate computer model 400 according to at least one embodiment of the present disclosure. Battery discharge rate computer model 400 includes an input layer 402, one or more hidden layers 404, and an output layer. During a learning phase, input layer 402 may receive workloads, battery discharge rates, or the like for a particular period of time. For example, input layer 402 may receive data indicating workload for a particular event, the processor executes one or more email applications, connected to cellular networks, is not connected to a charge, or the like. Input layer 402 may also receive historical data about the battery consumption or discharge rate based on the workload.

In an example, input layer 402 may also receive other discharge rate data. For example, input layer 402 may receive a user classification profile for the user of the information handling system 300. In certain examples, the user of information handling system 300 may be provided with a list of classification profiles for events that the user may typically attend for perform. These classification profiles may include historical data of discharge rates from other users with the same classification profile, so that discharge rate computer model 400 may calculate accurate expected discharge rates.

In certain examples, if the upcoming event is the first for the user and discharge rate computer model 400 does not have any historical data, the discharge rate computer model may utilize the calendar event and transit time to calculate an expected discharge rate without the use of historical data. In this example, discharge rate computer model 400 may receive and store actual discharge rates for the event to utilize for calculating expected discharge rates in the future.

Hidden layer 404 may receive this data, and utilize the data to calculate different expected battery consumptions or discharge rates based on expected events and amounts of time. As battery discharge rate computer model 400 is provided additional data, hidden layers 404 may update calculation models to provide an expected discharge rate at output layer 406.

During an execution phase, input layer 402 may receive data associated with a particular event and a period of time for that event. Input layer 402 may provide this data to hidden layers 404, which in turn may calculate an expected battery consumption or discharge rate during the period of time. Hidden layer 404 may provide the expected discharge rate to output layer 406, which in turn may provide the expected discharge rate to hardware configuration plugin 342, application load plugin 344, and battery power plugin 346.

Referring back to FIG. 3, processor may determine a current battery discharge rate for the battery. In an example, the current battery discharge rate or consumption rate may be based on a current workload of the processor. For example, as the current workload increases the current battery discharge rate may also increase. In certain examples, the current workload may include any suitable applications being executed by the processor including, but not limited to, calendar applications, word processing applications, spreadsheet applications, drawing applications, and internet applications. In an example, the current battery discharge rate may be any suitable rate including, but not limited to, a three percent decrease in battery charge level per hour, a ten percent decrease in battery charge level per hour, and a twenty percent decrease in battery charge level per hour.

In an example, processor 310 may determine a needed battery charge level for a start of the event and transit. In an example, the needed battery charge level may be determined based on any suitable information for the period of time. For example, if the event includes both a meeting and transit time to get to the meeting, the processor may utilize the meeting information to determine a length of time for the transit, an expected workload for the transit, a length of time for the meeting, an expected workload during the meeting. In an example, the processor may determine from historical data whether the battery may be charged during the transit and/or meeting, whether the battery will not be charged, or the like. Based on this information, the processor may determine a battery charge level needed at the start of the event.

Based on the current battery charge level, the current discharge rate, and the needed battery charge level, processor 310 may determine whether a battery usage change is needed. In an example, if the current battery charge level is a first level and the needed battery charge level is a second level, processor 310 may determine a difference between the two charge levels. Based on the current battery discharge rate, the amount of time before the start of the event, and the battery charge difference, processor 310 may determine whether the battery will be lower than the needed battery charge level at the current discharge rate. If the battery charge level will be lower, processor 310 may perform one or more actions to reduce the battery discharge rate from the current discharge rate to a rate at which the needed battery charge level will be met. Processor 310 may change any combination of settings within information handling system 300 to reduce the current discharge rate to the determined rate to ensure that the battery will have enough charge for the entire event.

In an example, processor 310 may utilize battery power plugin 346 to modify or change the battery charge state. For example, battery power plugin 346 may trigger a fast charging of the battery, an adaptive charging, or the like to increase the charge rate of the battery. Battery power plugin 346 may provide a trigger signal to BIOS 314 and to EC 312, which in turn may control a battery charging circuit, such as battery charging circuit 216 of FIG. 2, to update the charge rate for the battery.

Processor 310 may place information handling system 300 in a lower power state to provide the needed battery charge level at the start of the event. In an example, the lower power state may be any suitable power state including, but not limited to, a MS power state and a S4/S5 power state. Processor 310 may update or change a PLx status within information handling system 310 to decrease the current battery consumption or discharge rate.

In an example, processor 310, via application load plugin 344, may reduce the OS operating load, which in turn will decrease the current battery consumption or discharge rate. For example, application load plugin 344 may provide a signal to OS registry 354 to remove or quit one or more applications being executed by processor 310. Processor 310 may also reduce the current battery discharge rate by reducing display brightness 316, decreasing read/writes to memory 318, decreasing access to HDD 320, or the like. In certain examples, processor 310 may perform any combination of the above settings to reduce the current battery discharge rate to have the needed battery charge level at the start of the event. For example, processor 310 performance, via application running, may be reduced by a particular percentage, access to HDD 320 may be reduced by some percentage, read/write accesses to memory 318 may be reduced by a percentage, display brightness 316 may also be reduce by some percentage, or the like. In certain examples, the percent reduction for each setting may be any suitable percentage, and the percentages may be the same or different for each setting without varying from the scope of this disclosure.

In certain examples, processor 310 may execute notification system 352 to provide the user of information handling system 300 with a notification of the proposed setting changes to enable the battery to have the needed battery charge level at the start of the event. In an example, the notification may be a visual or audio message stating that the system will be throttled to ensure battery capacity during the event. The user may be provided with options to accept to reject the system throttling, to select advance settings, or the like. In an example, the advance setting may allow the user to set or control how information handling system 300 is throttled. In certain examples, the notification may provide the user with a graphical user interface (GUI) with a slider control, which in turn may allow the user to increase or decrease the throttling of information handling system 300.

One of ordinary skill would recognize that while the upcoming event was described herein as a meeting and transit to the meeting, the upcoming event may be any suitable event where information handling system 300 is not connected to a power source, such at AC power source 204 of FIG. 2, to charge the battery.

Figure 5:
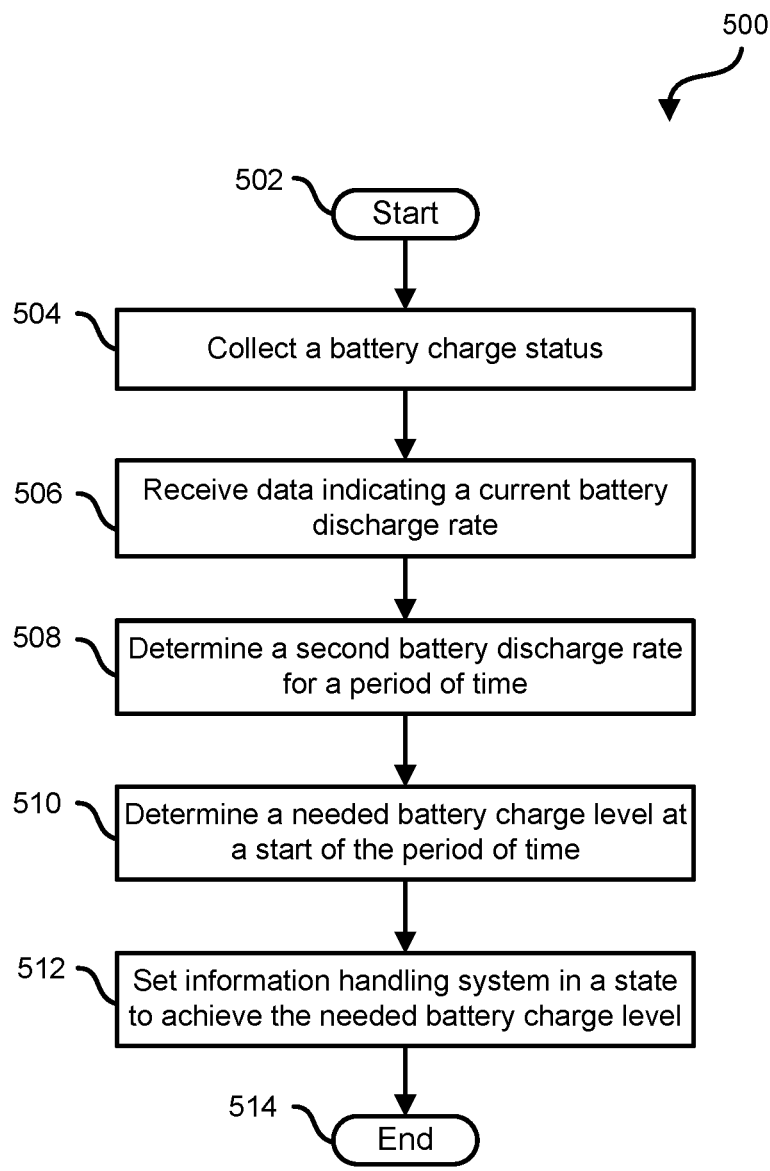
FIG. 5 is a flow diagram of a method for managing battery capabilities for predetermined activities according to at least one embodiment of the current disclosure.

FIG. 5 is a flow diagram of a method 500 for managing battery capabilities for predetermined activities according to at least one embodiment of the current disclosure, starting at block 502. It will be readily appreciated that not every method step set forth in this flow diagram is always necessary, and that certain steps of the methods may be combined, performed simultaneously, in a different order, or perhaps omitted, without varying from the scope of the disclosure. FIG. 5 may be employed in whole, or in part, by information handling system 100 depicted in FIG. 1, information handling system 200 depicted in FIG. 2, or any other type of system, controller, device, module, processor, or any combination thereof, operable to employ all, or portions of, the method of FIG. 5.

At block 504, a battery charge status for a battery of an information handling system is collected. In an example, the battery charge status may be collected by an embedded controller of the information handling system. The embedded controller may provide the collected battery charge status to an OS server of a processor within the information handling system. In certain examples, the battery charge status may be any suitable data associated with the current charge level of the battery including, but not limited to, a current percentage of battery charge remaining, such as twenty percent, fifty percent, sixty percent, seventy-five percent, or the like.

At block 506, data indicating a current battery discharge rate is received. In an example, the current battery discharge rate or consumption rate may be based on a current workload of the processor. For example, as the current workload increases the current battery discharge rate may also increase. In certain examples, the current workload may include any suitable applications being executed by the processor including, but not limited to, calendar applications, word processing applications, spreadsheet applications, drawing applications, and internet applications. In an example, the current battery discharge rate may be any suitable rate including, but not limited to, a three percent decrease in battery charge level per hour, a ten percent decrease in battery charge level per hour, and a twenty percent decrease in battery charge level per hour.

At block 508, a future battery discharge rate is determined. In an example, the future battery discharge rate may be determined based on any suitable information associated with expected usage in the information handling system. For example, the processor may determine expected workloads and battery consumption during a specific period of time. In certain examples, the processor may execute learned computer models to determine expected workloads, and the computer models may utilize historical data from workloads during similar periods of time. For example, the processor may receive calendar information for an upcoming meeting, and the information may include a location for the meeting, or the like. The processor also may receive information associated with a current location of the information handling system. Based on the meeting information and the current location, the processor may determine that the user may need to travel from the current location to the location of the meeting, and an amount of travel time. This information may be input to the learned computer model, which in turn may output expected battery consumption during the period of time for the transit from the current location to the location of the meeting.

At block 510, a needed battery charge level for a start of the period of time is determined. In an example, the needed battery charge level may be determined based on any suitable information for the period of time. For example, if the period of time includes both a meeting and transit time to get to the meeting, the processor may utilize the meeting information to determine a length of time for the transit, an expected workload for the transit, a length of time for the meeting, an expected workload during the meeting. In an example, the processor may determine from historical data whether the battery may be charged during the transit and/or meeting, whether the battery will not be charged, or the like. Based on this information, the processor may determine a battery charge level needed at the start of the period of time, such as a start of a meeting.

At block 512, a state of the information handling system is set to achieve the needed battery charge level, and the method ends at block 514. In an example, if the current battery charge level is a first level and the needed battery charge level is a second level, the processor may determine a difference between the two charge levels. Based on the current battery discharge rate, the amount of time before the start of the period of time, and the battery charge difference, the processor may determine whether the battery will be lower than the needed battery charge level at the current discharge rate. If the battery charge level will be lower, the processor may perform one or more actions to reduce the battery discharge rate from the current discharge rate to a rate at which the needed battery charge level will be met. The actions may include any suitable actions to change the battery charge level at the start of the period of time including, but not limited to, modifying a battery charge rate to increase the charging rate for the battery, enter the information handling system into a low power state, reduce workload of the processor, and provide a notification to a user to manually change the system to lower the discharge rate.

Referring back to FIG. 1, the information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a battery;
   an embedded controller to communicate with the battery, the embedded controller to collect a battery charge status; and
   a processor to communicate with the battery and with the embedded controller, the processor to:
      receive the battery charge status;
      receive data indicating a current battery discharge rate;
      determine a second battery discharge rate based on operations to be performed during a period of time;
      determine a needed battery charge level at a start of the period of time;
      based on the battery charge status, the current battery discharge rate, the second battery discharge rate, and the needed battery charge level, determine that a charge level of the battery will be lower than the needed battery charge level at the state of the period of time; and
      based on the determination that the charge level of the battery will be lower than the needed battery charge level at the start of the period of time, set the information handling system in a state to achieve the needed battery charge level.

2. The information handling system of claim 1, wherein the processor to execute a battery discharge rate computer model, the battery discharge rate computer model includes:
   an input layer to receive input data, wherein the input data includes historical data for battery discharge rates based on previous operations performed during a time period associated with the period of time;
   a hidden layer to calculate a projected battery discharge rate for the period of time based on the historical data; and
   an output layer to provide the second battery discharge rate based on the projected battery discharge rate.

3. The information handling system of claim 1, wherein the processor further to:
   receive current location information for the information handling system; receive destination location information for the information handling system at an end of the period of time; and
   based on the current location information and the destination location information, determine a total amount of time for the period of time.

4. The information handling system of claim 1, wherein the determination of the second battery discharge rate from the operations to be performed during the period of time is based on a user classification profile selected by the user.

5. The information handling system of claim 1, wherein the determination of the second discharge rate during the period of time, includes the processor to: provide a notification to a user of the information handling system that settings for the information handling system need to change for the battery to be at the needed battery charge level at the start of the period of time.

6. The information handling system of claim 1, wherein the setting of the information handling system in the state to achieve the battery charge level, includes the processor to: change a current power state of the information handling system.

7. The information handling system of claim 1, wherein the setting of the information handling system in the state to achieve the battery charge level, includes the processor to: change a charge rate for the battery.

8. The information handling system of claim 1, wherein the setting of the information handling system in the state to achieve the battery charge level, includes the processor to: modify a current operating load of an operating system executed by the processor.

9. A method comprising:
   collecting, by an embedded controller of an information handling system, a battery charge status of a battery of the information handling system;
   receiving, by a processor of the information handling system, the battery charge status;
   receiving data indicating a current battery discharge rate;
   determining a second battery discharge rate based on operations to be performed during a period of time;
   determining a needed battery charge level at a start of the period of time;
   based on the battery charge status, the current battery discharge rate, the second battery discharge rate, and the needed battery charge level, determining that a charge level of the battery will be lower than the needed battery charge level at the start of the period of time; and
   based on the determining that the charge level of the battery will be lower than the needed battery charge level at the state of the period of time, setting the information handling system in a state to achieve the battery charge level.

10. The method of claim 9, further comprising:
    receiving, at an input layer of a battery discharge rate computer model, input data including historical data for battery discharge rates based on previous operations performed during a time period associated with the period of time;
    calculating, at a hidden layer of the battery discharge rate computer model, a projected battery discharge rate for the period of time based on the historical data; and providing, at an output layer of the battery discharge rate computer model, the second battery discharge rate based on the projected battery discharge rate.

11. The method of claim 9, further comprising:
receiving current location information for the information handling system;
receiving destination location information for the information handling system at an end of the period of time; and
based on the current location information and the destination location information, determining a total amount of time for the period of time.

12. The method of claim 9, wherein the determination of the second battery discharge rate from the operations to be performed during the period of time is based on a user classification profile selected by the user.

13. The method of claim 9, wherein the determining of the second discharge rate during the period of time, the method further comprises:
providing a notification to a user of the information handling system that settings for the information handling system need to change for the battery to be at the needed battery charge level at the start of the period of time.

14. The method of claim 9, wherein the setting of the information handling system in the state to achieve the battery charge level, the method further comprises:
changing a current power state of the information handling system.

15. The method of claim 9, wherein the setting of the information handling system in the state to achieve the battery charge level, the method further comprises:
changing a current charging rate for the battery.

16. The method of claim 9, wherein the setting of the information handling system in the state to achieve the battery charge level, the method further comprises:
modifying a current operating load of an operating system executed by the processor.

17. A non-transitory computer-readable medium including code that when executed performs a method, the method comprising:
collecting, by an embedded controller of an information handling system, a battery charge status of a battery of the information handling system;
receiving, by a processor of the information handling system, the battery charge status;
receiving data indicating a current battery discharge rate;
determining a second battery discharge rate based on operations to be performed during a period of time;
determining a needed battery charge level at a start of the period of time; and
based on the battery charge status, the current battery discharge rate, the second battery discharge rate, and the needed battery charge level, determining that a charge level of the battery will be lower than the needed battery charge level at the start of the period of time; and
based on the determining that the charge level of the battery will be lower than the needed battery charge level at the state of the period of time, setting the information handling system in a state to achieve the battery charge level.

18. The non-transitory computer-readable medium of claim 17, wherein the method further comprises:
receiving, at an input layer of a battery discharge rate computer model, input data including historical data for battery discharge rates based on previous operations performed during a time period associated with the period of time;
calculating, at a hidden layer of the battery discharge rate computer model, a projected battery discharge rate for the period of time based on the historical data; and
providing, at an output layer of the battery discharge rate computer model, the second battery discharge rate based on the projected battery discharge rate.

19. The non-transitory computer-readable medium of claim 17, wherein the method further comprises:
receiving current location information for the information handling system;
receiving destination location information for the information handling system at an end of the period of time; and
based on the current location information and the destination location information, determining a total amount of time for the period of time.

20. The non-transitory computer-readable medium of claim 17, further comprising:
providing a notification to a user of the information handling system that settings for the information handling system need to change for the battery to be at the needed battery charge level at the start of the period of time.

* * * * *